United States Patent [19]

Lindenberger et al.

[11] Patent Number: 4,524,247

[45] Date of Patent: Jun. 18, 1985

[54] INTEGRATED ELECTROACOUSTIC TRANSDUCER WITH BUILT-IN BIAS

[75] Inventors: W. Stewart Lindenberger, Somerset; Tommy L. Poteat, Bridgewater; James E. West, Plainfield, all of N.J.

[73] Assignee: AT&T Bell Laboratories, Murray Hill, N.J.

[21] Appl. No.: 511,637

[22] Filed: Jul. 7, 1983

[51] Int. Cl.[3] .................................... H01G 5/16

[52] U.S. Cl. .................................... 179/111 R; 29/594; 307/400; 381/111; 381/114

[58] Field of Search .................... 179/111 R, 111 E; 29/594, 25.41; 307/88 ET; 381/114, 111

[56] References Cited

U.S. PATENT DOCUMENTS 3,118,022 1/1964 Sessler et al. .................. 179/111

4,149,095 4/1979 Poirier et al. .................. 307/400

4,207,442 6/1980 Freeman .................. 179/111 R 4,250,415 2/1981 Lewiner .................. 179/111 E 4,261,086 4/1981 Giachino .................. 29/25.41

*Primary Examiner*—Gene Z. Rubinson

*Assistant Examiner*—L. C. Schroeder

*Attorney, Agent, or Firm*—Lester H. Birnbaum

[57] ABSTRACT

Disclosed is an electroacoustic transducer structure which can be formed in a semiconductor substrate and incorporated as part of an integrated circuit, and which provides a built-in dc bias for operation. An appropriate density of fixed charge is provided in an insulating layer adjacent to one of the electrodes in the gap between electrodes. Methods of manufacture are also disclosed including means for introducing the charge by contacting the insulating layer with a liquid medium, plasma charging, or by ion beam implanting into the layer.

7 Claims, 5 Drawing Figures

INTEGRATED ELECTROACOUSTIC TRANSDUCER WITH BUILT-IN BIAS

BACKGROUND OF THE INVENTION

This invention relates to electroacoustic transducers such as microphones which may be integrated into a semiconductor substrate including other components.

Presently, demand is growing for a microphone which may be formed as part of an integrated circuit for such uses as telecommunications. Miniature microphones presently available usually take the form of a foil (which may be charged) supported over a metal plate on a printed circuit board so as to form a variable capacitor responsive to voice band frequencies. While the operation of such devices is adequate, they are quite distinct from the integrated circuitry with which they are used. A microphone which could be integrated with other components in an integrated circuit would be more compact, more economical to manufacture and ultimately have lower parasitics and better performance.

Recently, an integrated microphone structure and method of manufacture were proposed. (See U.S. patent application of I. J. Busch-Vishniac et al, Ser. No. 469,410, filed Feb. 24, 1983 and assigned to the present assignee, which application is incorporated by reference herein.) Briefly, the microphone included a membrane formed from a thinned portion of a thicker semiconductor substrate, which membrane had a thickness and area such that it vibrated in response to incident sound waves. A pair of electrodes formed a capacitor, and one of the electrodes was formed to vibrate with the membrane such that the capacitance varied in response to the sound waves and an electrical equivalent to the acoustic signal could be produced.

Such microphones offer considerable promise for the replacement of distinct miniature microphones previously described. However, with this or other types of integrated capacitive microphones, the dc bias available for integrated circuits limits the sensitivity of the microphone and places constraints on the size of the air gap (the separation of the electrodes). It has been suggested to charge an electrode of a microphone, thereby forming an "electret" (charged layer), which is combined with other components in an integrated circuit (see U.S. Pat. No. 4,149,095 issued to Poirier et al). However, there is apparently no previous teaching as to how a built-in bias could be provided in a completely integrated microphone.

It is therefore a primary object of the invention to provide an integrated electroacoustic transducer with a built-in bias, and a method of manufacturing such a structure which is compatible with integrated circuit fabrication techniques.

SUMMARY OF THE INVENTION

These and other objects are achieved in accordance with the invention which is an electroacoustic transducer formed in the semiconductor substrate. The transducer comprises a diaphragm which vibrates in response to an input signal at audio and ultrasonic frequencies, and a pair of electrodes placed with respect to said diaphragm so that the electric field between the electrodes varies in relationship with the vibrating diaphragm to permit conversion between electrical and acoustic signals. An insulating layer is provided adjacent to at least one of the electrodes in the area between the electrodes. The insulating layer includes a distribution of fixed charge so as to provide a built-in dc bias for the electrodes.

BRIEF DESCRIPTION OF THE DRAWING

These and other features are delineated in detail in the following description. In the drawing.

Figure 1:
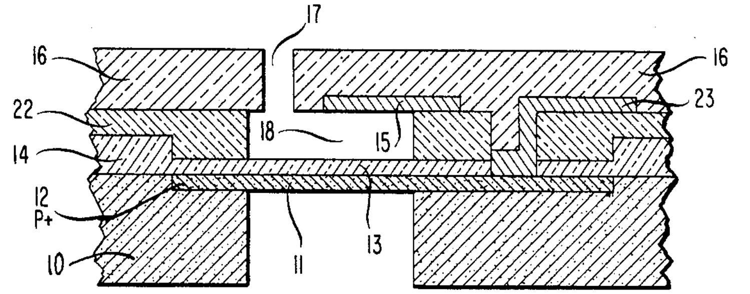
FIG. 1 is a cross-sectional view of an integrated microphone in accordance with one embodiment of the invention.

It will be appreciated that for purposes of illustration these figures are not necessarily drawn to scale.

DETAILED DESCRIPTION

The basic features of the invention are described with reference to the integrated capacitive microphone embodiment illustrated in FIG. 1. It will be appreciated that other microphone structures may also incorporate the features of the invention. It will also be appreciated that although only a single integrated microphone is shown, the semiconductor substrate would typically include many more identical microphones along with associated integrated electronic components.

The structure is formed in a p-type silicon substrate, 10, which includes a surface region 12 of higher impurity concentration than the bulk (in this case p+) (of course, n-type semiconductor material may also be used). The semiconductor is thinned down, as by etching to the boundary of the regions 12, to form a silicon diaphragm, 11, which is capable of vibrating in response to an input signal at audio (0.02–20 KHz) and ultrasonic (20–1000 KHz) frequencies and is particularly suited for use with signals in the voice band (0.3–3.5 KHz) for telephone applications. In accordance with a feature of the invention, an insulating layer, 13, such as $SiO_2$ is formed on the membrane, 11, in an air cavity 18.

In the area outside the membrane, a thick insulating layer, 14, can be formed to define the boundaries of the p+ layer 12 and provide insulation for other portions of the circuit. Conveniently, the layers 13 and 14 can be formed from the same layer, for example $SiO_2$, which is patterned into thick and thin portions as in the formation of gate oxide and field oxide regions in standard IC fabrication.

Formed over the insulating layers 13 and 14 is a spacer layer, 22, which in this example is boron nitride, having a thickness which defines the air cavity 18. If desired, the thick oxide layer 14, if grown to a sufficient thickness, may be used as a spacer layer without the need for the additional layer 22.

Formed on the spacer layer and extending over the air cavity is a metal layer 15. A metal contact, 23, to the p+ region 12 is also provided through a window in the layers 22, and 13. A further insulating layer, 16 is formed over the spacer layer 22 and metal layers 15 and 23 to provide mechanical rigidity in addition to that of metal layer 15. Holes such as 17 are formed through the backing layer 16 to permit acoustic venting.

Metal layer 15 and surface layer 12, due to its high conductivity, form two electrodes of a capacitor. The capacitance will vary depending on the motion of the diaphragm and so an electrical equivalent to an acoustic input can be produced. (For a more detailed discussion of an integrated capacitive microphone operation, see application of Bush-Vishniac, cited above.)

In accordance with a further feature of the invention, the insulating layer, 13, includes stored fixed charge with a density so as to establish a desired built-in dc bias for the capacitor. The charge density is chosen according to a desired microphone sensitivity, which is a function of the electric field between the capacitor electrodes. Thus, $$S\alpha E = V/d = \sigma\epsilon \quad (1)$$

where S is sensitivity, E is electric field across the air gap, V is the voltage across the capacitor electrodes, d is the spacing of the air gap (the distance between electrode 15 and insulator 13), $\epsilon$ is the permittivity of the material between the electrodes, and $\sigma$ is the surface charge density in the insulating layer 13.

It will be appreciated from the above equation that providing a fixed charge density not only increases the sensitivity of the device, but also relaxes the requirement for a very narrow air gap (d). It will also be appreciated that the charged insulating layer could be formed on either electrode of the capacitor.

In a particular example, a sensitivity of 100 millivolts/Pa is achieved by formation of a fixed surface charge density of 200 nano-coul/$cm^2$ which provides a built-in bias of 60 volts for a capacitor with plate separation of 1.5 $\mu$m. For general microphone applications, a fixed surface charge density of 3–1000 nano-coul/$cm^2$ is desirable. A desirable minimum dc bias provided by the charge in the insulating layer is 5 volts. In this example, the insulating layer 13 was $SiO_2$ with a thickness of approximately 1 $\mu$m. Thickness of 0.02–2.0 $\mu$m are generally useful. Other insulating layers commonly used in IC fabrication may also be utilized in place of $SiO_2$, or combinations of insulators might be used in a single device.

Figure 2:
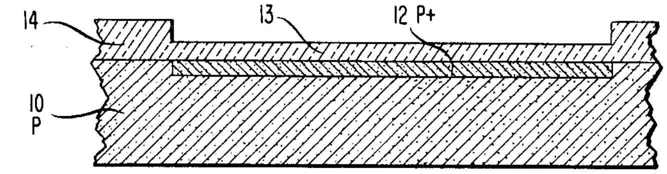
FIGS. 2–5 are cross-sectional views of the device of FIG. 1 during various stages of fabrication.

FIGS. 2–5 illustrate how the structure of FIG. 1 can be manufactured in accordance with one example. As shown in FIG. 2, the starting material is typically a wafer, 10, of single crystal silicon. Formed on one major surface of the semiconductor is an $SiO_2$ layer patterned into thick and thin regions, 14 and 13, respectively, in accordance with standard procedures for forming field oxide and gate oxide regions in IC manufacture. The portion, 13, is typically 0.02 $\mu$m thick and the portion, 14, is typically 0.4 $\mu$m thick. The lateral dimensions of region 13 are made large enough to cover the subsequently formed diaphragm and contact area to the diaphragm.

As also shown in FIG. 2, the structure is implanted with impurities such as boron to produce surface layer 12 where the impurities penetrate layer 13 but are masked by layer 14. For example, a dose of $8\times10^{15}$ $cm^{-2}$ and an energy of 115 keV can be used to give a concentration of approximately $10^{20}$ $cm^{-3}$ and depth of approximately 0.5 $\mu$m in the area defined by layer 13.

Figure 3:
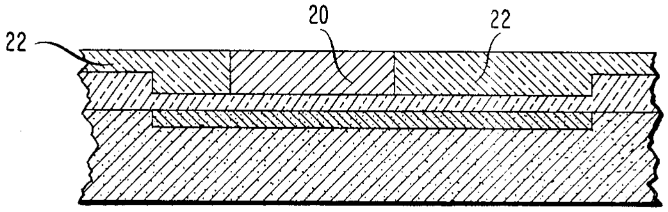

Next, as shown in FIG. 3, an insulating layer 22 is deposited over the layers 13 and 14 to a thickness which will establish the height of the air cavity. The layer is then patterned by standard photolithography to expose the area of layer 13 which will cover the diaphragm and thereby establish the boundaries of the air cavity. In this example, the layer is boron nitride with a thickness of 1.5 $\mu$m, and the exposed area is a circle with a diameter of 1.5 $\mu$mm.

A typical process for growing $SiO_2$, which involves temperatures in the range 950° C.–1150° C., may produce sufficient inherent charge in the insulating layer to be suitable for the present invention as a result of dangling bonds from the silicon surface. If additional charge is desired, it may be introduced at this point by irradiation techniques such as electron-beam exposure or ion implantation of impurities.

In the next step, as also illustrated in FIG. 3, a layer of filler material, 20, is deposited, patterned and planarized to fill the recess in the layer 22. In this example, the layer 20 is polycrystalline silicon deposited by chemical vapor deposition to a thickness of approximately twice the thickness of layer 22 and patterned by standard lithographic techniques and chemical etching. Planarization can be accomplished, for example, by covering with a resist and etching by reactive ion etching or plasma techniques.

Figure 4:
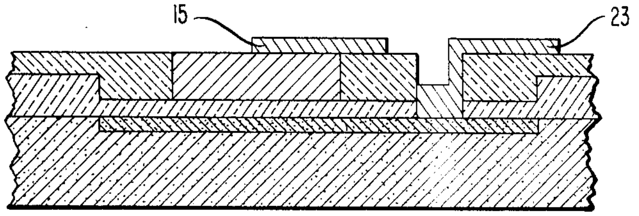

In the next sequence of steps, as illustrated in FIG. 4, a contact window can be opened by standard photolithographic etching through layers 22 and 13, followed by depositing a metal layer over the layer 22 and filler material and patterning to form electrode 15 which covers a substantial portion of the filler area and to form contact 23 to the p+ region. In this particular example, the layer is aluminum with a thickness of 0.5 $\mu$m, but other conductors could be used as long as they are not etched in the subsequent processing.

Figure 5:
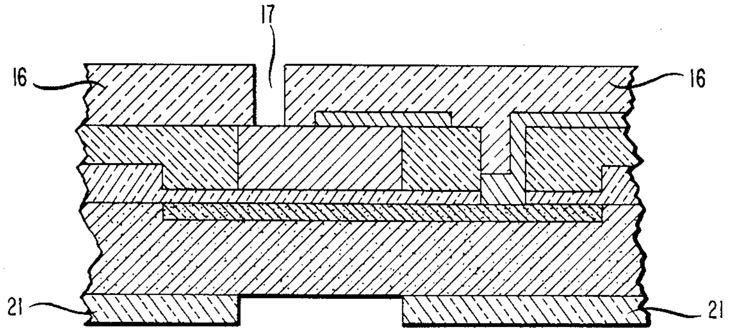

As shown in FIG. 5, a further insulating layer is then deposited over both surfaces of the semiconductor to form a backing layer, 16, on the front surface and a masking layer, 21, on the back surface. The layer in this example is boron nitride with a thickness of approximately 5.0 $\mu$m. The layer, 16, on the front surface can be patterned to form holes such as 17 up to the filler material by photolithography and chemical etching. Subsequently, the layer 21 on the back surface may be patterned by photolithography and chemical etching to expose the surface of the semiconductor aligned with the portion of the front surface which will comprise the membrane.

The air cavity (18 of FIG. 1) can then be formed by applying through hole 17 an etchant which removes the filler material but does not attack the oxide layer 13, the insulating layer 22, the metal layer 15, or the backing layer 16. One such etchant is ethylenediamine, catechol and water. This also leaves the metal layer 15 embedded within the backing layer 16. The membrane can then be formed by etching through the back surface, for example, with an etchant which stops at the boundary of surface layer 12.

Other methods of introducing the appropriate charge into the insulating material may also be employed. For example, it may be desirable to introduce the charge only after all or most of the processing is completed to avoid any adverse effect on the stored charge resulting from temperatures used in forming the various layers. In such cases, the charging may be accomplished after membrane 11 is formed by ion implantation or electron beam injection through the membrane into layer 13. Appropriate annealing after charge injection may then be effected to reduce irradiation damage, thus stabilizing the injected charge. A typical annealing cycle involves heating to 100°–300° C. for 5–10 minutes. Alternatively, the layer 13 may be charged after the air cavity is formed, and either before or after the membrane is formed, by introducing a liquid medium such as alcohol into the air gap. The desired built-in dc potential is then applied by some external voltage source to the electrodes 12 and 15. This causes the desired surface charge density to form as a result of ionic migration in the liquid.

If it is desired to charge the layer as soon as it is deposited, the structure may be placed in a standard plasma discharge chamber and a plasma generated from a gas, such as $CF_4$ which will supply the appropriate charged particles to the insulating layer. The layer can then be annealed, for example, at 250°.

It will be understood that in the context of this application "ion implantation" is meant to include electron-beam implantation.

It will also be appreciated that, although the invention has been described with reference to a microphone, it can be used with any electroacoustic transducer which relies upon an electric field between two electrodes varying in relationship with a vibrating diaphragm, whether the energy conversion is from acoustic to electrical or vice-versa. For example, a loudspeaker or hearing aid might be fabricated from essentially the same structure as FIG. 1 by applying a varying electrical signal to the electrodes 12 and 15 which causes vibration of the diaphragm, 11. An acoustic output signal would therefore be produced.

It will also be realized that the invention is not limited to telephone band frequencies (0.3–3.5 KHz), but in fact could be used in the full audio bandwidth (0.02–20 KHz) or in the ultrasonic frequency range (20–1000 KHz).

Various additional modifications of the invention will become apparent to those skilled in the art. All such variations which basically rely on the teachings through which the invention has advanced the art are properly considered within the scope and spirit of the invention.

What is claimed is:

1. An electroacoustic transducer formed in a semiconductor substrate and comprising:

a diaphragm which vibrates in response to an input signal at audio and ultrasonic frequencies;

a pair of electrodes placed with respect to said diaphragm so that the electric field between the electrodes varies in relationship with the vibrating diaphragm to permit conversion between electrical and acoustic signals, said electrodes defining a capacitor; and an insulating layer adjacent to at least one of the electrodes in the area between the electrodes and including a distribution of fixed charge so as to provide a dc bias for the capacitor.

2. The device according to claim 1 wherein the device is a microphone where the diaphragm vibrates in response to an acoustic input signal and the capacitance of the capacitor varies in relation to the vibrating diaphragm to produce an equivalent electrical output signal.

3. The device according to claim 1 wherein the surface charge density of the insulating layer is 3–1000 nano-coul/$cm^2$.

4. The device according to claim 1 wherein the insulating layer comprises $SiO_2$.

5. The device according to claim 1 wherein the diaphragm comprises a layer of semiconductor material and the insulating layer is formed on the surface of said semiconductor so as to vibrate with the diaphragm.

6. The device according to claim 5 wherein the portion of the insulating layer over the diaphragm comprises a thinned portion of a thicker insulator over other areas of the semiconductor substrate.

7. The device according to claim 1 wherein the dc bias provided by the charge in the insulating layer is at least 5 volts.

* * * * *

UNITED STATES PATENT AND TRADEMARK OFFICE

CERTIFICATE OF CORRECTION

PATENT NO. : 4,524,247

DATED : June 18, 1985

INVENTOR(S) : W. Stewart Lindenberger, Tommy L. Poteat and James E. West

It is certified that error appears in the above-identified patent and that said Letters Patent is hereby corrected as shown below:

Column 3, line 8, "$S\alpha E = V/d = \sigma\varepsilon$" should read --$S \alpha E = V/d = \sigma/\varepsilon$--; line 64, "1.5 μmm" should read --1.5 mm--.

Signed and Sealed this

*Fourth* Day of *February 1986*

[SEAL]

*Attest:*

DONALD J. QUIGG

*Attesting Officer* *Commissioner of Patents and Trademarks*